United States Patent
Moser et al.

(10) Patent No.: US 11,721,855 B2
(45) Date of Patent: Aug. 8, 2023

(54) TEMPERATURE CONTROL DEVICE FOR CONTROLLING THE TEMPERATURE OF AN ELECTRIC DEVICE

(71) Applicant: Mahle International GmbH, Stuttgart (DE)

(72) Inventors: Michael Moser, Ellwangen (DE);
Thorsten Mueller, Benningen (DE);
Daniel Rothmaier, Maulbronn (DE);
Volker Schall, Hemmingen (DE);
Dominique Weinmann, Rottenburg (DE)

(73) Assignee: Mahle International GmbH

( * ) Notice: Subject to any disclaimer, the term of this patent is extended or adjusted under 35 U.S.C. 154(b) by 262 days.

(21) Appl. No.: 17/064,590

(22) Filed: Oct. 6, 2020

(65) Prior Publication Data

US 2021/0104792 A1    Apr. 8, 2021

(30) Foreign Application Priority Data

Oct. 7, 2019    (DE) .................... 10 2019 215 336.4

(51) Int. Cl.
*H01M 10/6557*    (2014.01)
*H01M 10/613*    (2014.01)

(52) U.S. Cl.
CPC ..... *H01M 10/6557* (2015.04); *H01M 10/613* (2015.04)

(58) Field of Classification Search
CPC .................... H01M 10/6557; H01M 10/613
See application file for complete search history.

(56) References Cited

U.S. PATENT DOCUMENTS

| 5,205,348 | A  | 4/1993 | Tousignant et al. |
| 5,740,018 | A  | 4/1998 | Rumbut, Jr. |
| 9,429,372 | B2 | 8/2016 | Hirsch et al. |
| 9,546,827 | B2 | 1/2017 | Ludwig et al. |
| 9,593,891 | B2 | 3/2017 | Moser et al. |
| 10,680,296 | B2 | 6/2020 | Moser et al. |

(Continued)

FOREIGN PATENT DOCUMENTS

| DE | 102011084000 A1 | 5/2012 |
| DE | 102011079091 A1 | 1/2013 |

(Continued)

OTHER PUBLICATIONS

Zahn, WO-2011147550-A1, published Dec. 1, 2011 (Year: 2011).*

(Continued)

*Primary Examiner* — Jimmy Vo
(74) *Attorney, Agent, or Firm* — Fishman Stewart PLLC

(57) ABSTRACT

A temperature control device for controlling a temperature of an electric device may include at least one fluid channel through which a temperature control fluid may be flowable. The at least one fluid channel may be delimited, at least partially, by at least one volume-variable casing of a flexible material. The temperature control device may further include at least one fastening device. The at least one fastening device may surround a fluid chamber through which the temperature control fluid may be flowable. The at least one casing may be coupled to the at least one fastening device such that the fluid chamber is in fluid communication with the at least one fluid channel.

20 Claims, 3 Drawing Sheets

(56) References Cited

U.S. PATENT DOCUMENTS

2004/0074630 A1    4/2004   Sen et al.
2007/0297137 A1    12/2007   Glahn et al.

FOREIGN PATENT DOCUMENTS

| DE | 102013000213 A1 | 7/2013 | | |
|----|----|----|----|----|
| DE | 102015208999 A1 | 11/2016 | | |
| WO | WO-2011147550 A1 | * | 12/2011 | .............. B23P 19/04 |
| WO | WO-2014087234 A1 | * | 6/2014 | .......... H01M 10/613 |

OTHER PUBLICATIONS

Nagamine, WO-2014087234-A1, published Jun. 12, 2014 (Year: 2014).*
English abstract for DE-102013000213.

* cited by examiner

TEMPERATURE CONTROL DEVICE FOR CONTROLLING THE TEMPERATURE OF AN ELECTRIC DEVICE

CROSS-REFERENCE TO RELATED APPLICATIONS

This application claims priority to German Patent Application No. DE 10 2019 215 336.4, filed on Oct. 7, 2019, the contents of which is hereby incorporated by reference in its entirety.

TECHNICAL FIELD

The invention relates to a temperature control device for controlling the temperature of an electric device. The invention relates furthermore to a battery arrangement with such a temperature control device.

BACKGROUND

In modern vehicles, efficient electrical energy stores such as lithium-ion batteries for example are coming increasingly into use. For a correct functioning of these energy stores, it is absolutely necessary that their operating temperature neither exceeds a predetermined maximum value nor falls below a predetermined minimum value. It is therefore known to control the temperature of the electric device with the aid of a suitable temperature control device.

Against this background, DE 10 2011 084 000 A1 describes a device for guiding a cooling fluid for cooling an electric component. The device comprises a fluid-guiding chamber for guiding a cooling fluid, which can be closed in a fluid-tight manner by means of an at least partially flexible cover. This flexible cover forms a heat transfer region for heat conduction between the cooling fluid and the electric component which is to be cooled.

SUMMARY

It is an object of the present invention to create an improved embodiment for a temperature control device, which in particular has an improved efficiency in controlling the temperature of electric devices, in particular of batteries.

This problem is solved by the subject matter of the independent claim(s). Preferred embodiments are the subject matter of the dependent claim(s).

The basic idea of the invention accordingly is to delimit at least partially through a volume-variable casing a fluid channel which can be flowed through by a temperature control fluid for controlling the temperature—therefore for cooling or heating an electric device—for example an electric battery. Said volume variability of such a casing allows the casing to be able to lie flat against said electric device or respectively its housing. Through this becomes whereby the thermal coupling can be improved between the coolant, which is directed through the casing, and the temperature-controlled device which is to be cooled. This leads to an improved efficiency of the temperature control device.

A temperature control device according to the invention for controlling the temperature of an electric device, in particular an electric battery, comprises at least one fluid channel able to be flowed through by a temperature control fluid, which fluid channel is delimited at least partially by at least one volume-variable casing of a flexible material. Furthermore, the temperature control device comprises at least one fastening device which surrounds a preferably non-volume-variable fluid chamber able to be flowed through by the temperature control fluid and on which the casing is fastened. The fastening device and the casing are coordinated with one another here in such a way that the fluid chamber communicates fluidically with the at least one fluid channel.

According to an advantageous further development, two fastening devices are present, between which the casing is arranged so that a first fastening device forms a temperature control fluid inlet and a second fastening device forms a temperature control fluid outlet for the temperature control fluid which is to be directed through the fluid channel. This permits a linear throughflow of the casing between temperature control fluid inlet and temperature control fluid outlet.

Expediently, the at least one fastening device can be configured in the manner of a fastening strip which has an elongated geometric shaping and the longitudinal sides of which extend along a longitudinal direction. In this variant, the at least one casing is fastened along the longitudinal direction on the fastening strip or respectively fastening device. In this way, the volume-variable casing can be fixed in the desired installation space in a mechanically stable manner.

According to an advantageous further development, at least two fastening devices are provided which are configured as fastening strips. In this further development, the at least two fastening devices or respectively fastening strips are arranged adjacent to one another with the formation of an intermediate space for receiving the electric device which is to be temperature-controlled. This variant permits a temperature control on both sides of the electric device which is to be temperature-controlled by means of the two casings lying opposite one another transversely to the intermediate space.

According to an advantageous further development, on the at least one fastening device a connecting piece is formed for the formation of the temperature control fluid inlet or temperature control fluid outlet. This further development is particularly compact in construction and is also cost-efficient in manufacture.

According to another preferred embodiment, the fastening device can be configured as a hood. If the casing is fastened on said hood, then in this way a particularly great flow cross-section is realized between the fastening device and the fluid channel which is delimited by the casing.

According to another preferred embodiment, the at least one fastening device is configured as a fastening frame which circumferentially surrounds, preferably completely, a through-opening, which is closed on both sides by the casing. In this case, the casing can be configured having two parts. However, this embodiment is particularly suitable when the fastening frame is arranged with the casing in an intermediate space between two adjacent batteries or respectively battery housings which are to be temperature-controlled. A first part of the two-part casing can therefore lie flat against a first battery or respectively a first battery housing, the second part of the casing against the adjacent second battery or respectively the adjacent second battery housing.

According to a preferred embodiment, the fastening device is configured as a fastening strip which is able to be flowed through by the temperature control fluid. In this embodiment, the fastening strip is connected with a fastening frame which, together with the casing, delimits the fluid channel.

According to another preferred embodiment, the fastening frame is not configured to be able to be flowed through by the temperature control fluid. In this embodiment, the structure of the fastening frame can be configured particularly simply, from which cost advantages result in the manufacture thereof.

According to an advantageous further development, at least one flow-guiding element is arranged on the fastening strip, which flow-guiding element projects into the fluid channel. In this way, the thermal interaction of the fluid can be improved for heat absorption or heat dissipation, and therefore the efficiency of the temperature control device can be increased.

Expediently, the fastening frame can be provided with a substantially rectangular geometric shaping with two longitudinal sides and with two broad sides. In this variant, the flow-guiding element has a T-shaped geometry with one foot shank and one top shank. In this variant, the foot shank extends parallel to the broad side, and the top shank extends along the longitudinal side, or vice versa.

Particularly preferably, the casing is mounted circumferentially, preferably completely circumferentially, on the fastening frame. In this way, the casing can be fixed in the installed state in a particularly stable manner in the desired installation space.

Particularly preferably, the at least one casing can be configured in the manner of a bag or in the manner of a cushion. Such a configuration as a bag or respectively cushion makes it possible, with corresponding pressurization of the temperature control fluid flowing through the casing, to increase the volume of the casing so that it surrounds in a flat manner the electric device which is to be temperature-controlled, or respectively lies flat against the latter. In this way, the thermal coupling of the temperature control fluid with the electric device which is to be temperature-controlled is improved.

Expediently, the flexible material of the casing can be a foil. In this way, in particular bags or respectively cushions with variable volume can be realized.

According to a further preferred embodiment, the volume-variable casing is configured in such a way that the volume limited by the casing and forming the fluid channel is greater in a state when flowed through by the temperature control fluid than in a state in which no temperature control fluid is flowing through the fluid channel. In this way, it is achieved that intermediate spaces present between the casing and the electric device which is to be temperature-controlled are partially or even completely closed as soon as the casing is flowed through by the temperature control fluid. In this way, the thermal contact surface between the device which is to be temperature-controlled and the casing which is flowed through the by the temperature control fluid is improved.

The invention also relates to a battery arrangement with at least one battery, having a battery housing, and a temperature control device according to the invention, explained above. The advantages of the temperature control device according to the invention, which are explained above, are therefore transferred also to the battery arrangement according to the invention. According to the invention, the volume-variable casing, at least in a state when flowed through by the temperature control fluid, lies with at least one contact zone in a flat manner against at least one housing section of the battery housing.

According to a preferred embodiment, the casing, at least in a state when flowed through by the temperature control fluid, is squeezed between two battery housings arranged in adjacent intermediate spaces. In this way, a flat contact is achieved between the casing and the device which is to be temperature-controlled, whereby the efficiency of the temperature control device can be increased.

Further important features and advantages of the invention will emerge from the subclaims, from the drawings and from the associated figure description with the aid of the drawings.

It shall be understood that the features mentioned above and to be further explained below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively schematically.

DETAILED DESCRIPTION

Figure 1:
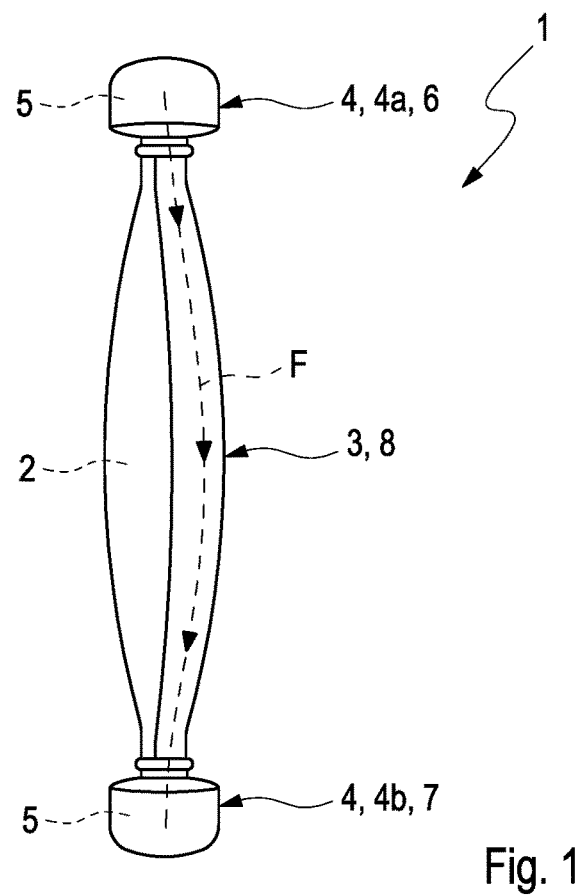
FIG. 1 shows a first example of a temperature control device according to the invention with a casing of variable volume arranged between two fastening devices.

FIG. 1 shows a first example of a temperature control device 1 according to the invention for controlling the temperature of an electric device in the form of an electric battery (not shown in FIG. 1). The temperature control device 1 comprises a fluid channel 2, able to be flowed through by a temperature control fluid, which fluid channel is delimited partially by at least one volume-variable casing 3 of a flexible material. The temperature control device 1 further comprises two fastening devices 4. Each of the two fastening devices 4, therefore a first fastening device 4a and a second fastening device 4b, comprises a fluid chamber 5 which is able to be flowed through by the temperature control fluid F and—in contrast to the casing 3—is not volume-variable, which communicates fluidically with the fluid channel 2.

The casing 3 is arranged between the two fastening devices 4a, 4b. Therefore, the first fastening device 4a can form a temperature control fluid inlet 6 for introducing the temperature control fluid into the fluid channel 4. The second fastening device 4b can form accordingly a temperature control fluid outlet 7 for discharging the temperature control fluid which has flowed through the fluid channel 2.

Here, the volume-variable casing 3 is configured in such a way that the volume delimited by the casing 3 and forming the fluid channel 2 is greater in a state when flowed through by the temperature control fluid F than in a state in which no temperature control fluid is flowing through the fluid channel 2. For this, a flexible and/or an elastic material can be used for the casing 3. In particular, a foil 8 can be used as flexible material for the casing 3. Said foil 8 can be formed here in a single-layered or multi-layered manner.

The casing 3 is fastened here—for example by means of an adhesive connection or another materially bonded connection—permanently on the two fastening devices 4a, 4b. Instead of an adhesive connection, in particular a welded connection is conceivable, which proves to be advantageous when the casing 3 is formed by said foil 8. Alternatively thereto, said permanent fastening can be realized by means of hot gas, ultrasound or hot stamping.

A plastic, preferably a non-elastic plastic, comes into consideration as material for the fastening devices 4a, 4b.

Figure 2:
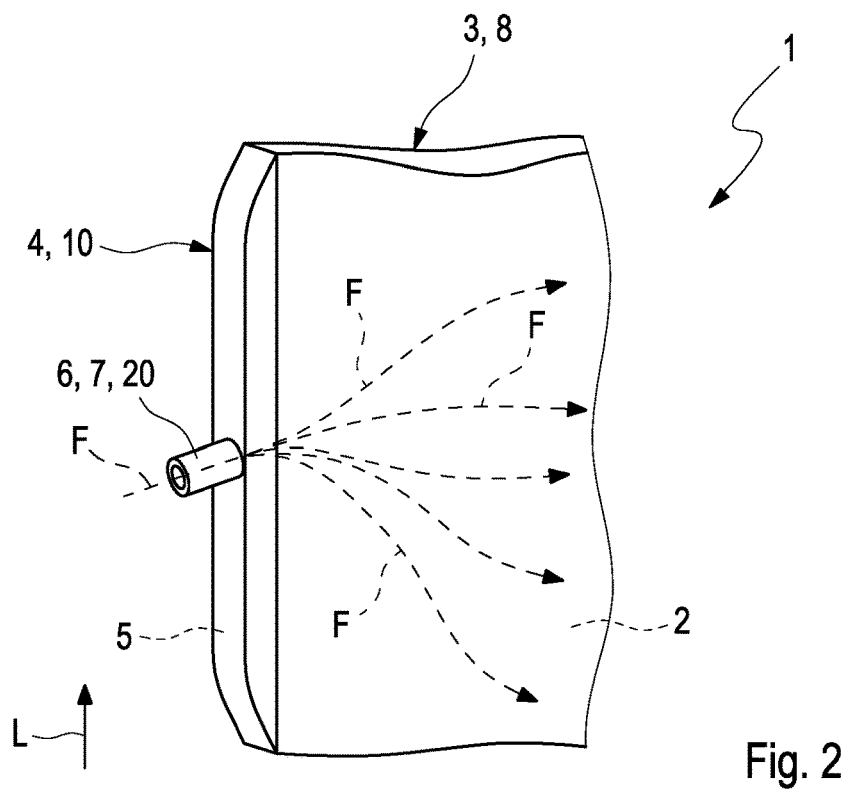
FIG. 2 shows a second example of a temperature control device according to the invention, in which the fastening device is configured as a fastening strip.

FIG. 2 illustrates a second example of a temperature control device 1 according to the invention. In the example of FIG. 2, the temperature control device 1 comprises only one single fastening device 4, which is configured as a fastening strip 10. The fastening device 4, configured as elongated fastening strip 10, extends along a longitudinal direction L. Along the longitudinal direction L, the casing 3 is fastened in an analogous manner on the fastening device 4 or respectively on the fastening strip 10 as was already explained with the aid of FIG. 1. The above explanations concerning the example of FIG. 1 therefore also apply, in so far as appropriate, for the example of FIG. 2.

On the fastening device 4 according to FIG. 2, a connecting piece 20 can be formed for the formation of the temperature control fluid inlet 6 or temperature control fluid outlet 7.

Figure 3:
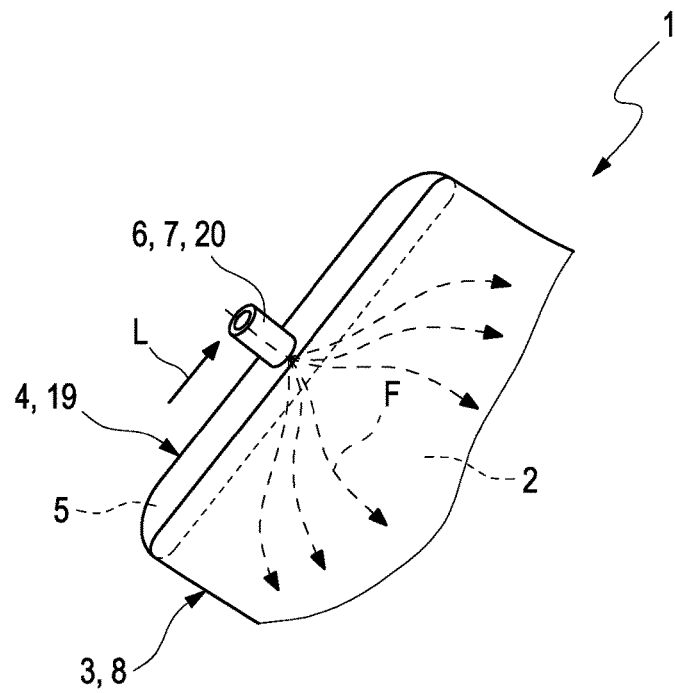
FIG. 3 shows a second example of a temperature control device according to the invention, in which the fastening device has a hood-like geometric shaping.

FIG. 3 illustrates a variant of the example of FIG. 2. In the example of FIG. 3, the fastening device 4, compared to the example of FIG. 2, is configured as a hood 19.

Figure 4:
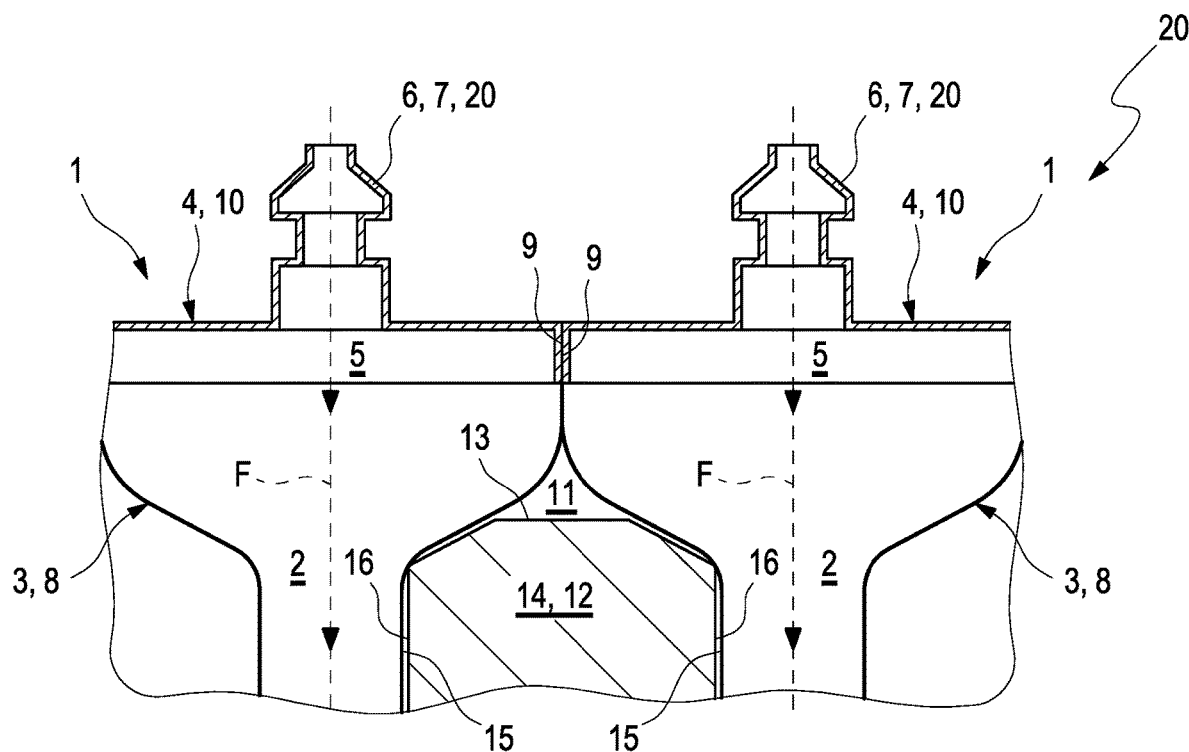
FIG. 4 shows an example of a battery arrangement according to the invention with temperature control devices, the fastening devices of which is respectively configured as a fastening strip.

FIG. 4 illustrates a further development of the example of FIG. 2. According to this further development, several fastening devices 4, respectively configured as fastening strip 10, are arranged adjacent to one another. In the example of FIG. 4, for the sake of clarity here only two such fastening strips 10 are shown. Adjacent fastening strips 10 or respectively fastening devices 4 are arranged adjacent to one another with the formation of a respective intermediate space 11 between the two fastening strips 10 or respectively fastening devices 4. At the same time, adjacent fastening strips 10 or respectively fastening devices 4 touch one another in the region of a respective contact section 9. This permits on the one hand a defined arrangement of the adjacent fastening strips 10 with the formation of a defined intermediate space 11 between the two adjacent fastening strips 10. In the intermediate space 11, the electric device 14 which is to be temperature-controlled—in particular a battery 12 with a battery housing 13—can be arranged.

As FIG. 4 illustrates in addition, the two casings 3 delimiting a respective intermediate space 11, in the state shown in FIG. 4, when flowed through by the temperature control fluid F, lie with respective contact zones 15 flat against housing sections 16 of the battery housing 13 which are to be temperature-controlled.

As FIG. 4 shows in addition, the respective casing 3 is moved by the pressurized temperature control fluid F, directed through the fluid channel 2, into a state with maximum volume. In this state, the size of the contact zones 15, which lies/lie against housing sections 16 of the battery housing 13, is maximum. Therefore, in this state the respective casing 3 is squeezed between two battery housings 13 arranged in adjacent intermediate spaces 11.

The fastening devices 4 shown in FIG. 4 in the form of fastening strips 10 form a battery arrangement 20 according to the invention together with the batteries 12 arranged in the intermediate spaces 11, which batteries have a battery housing 13.

Figure 5:
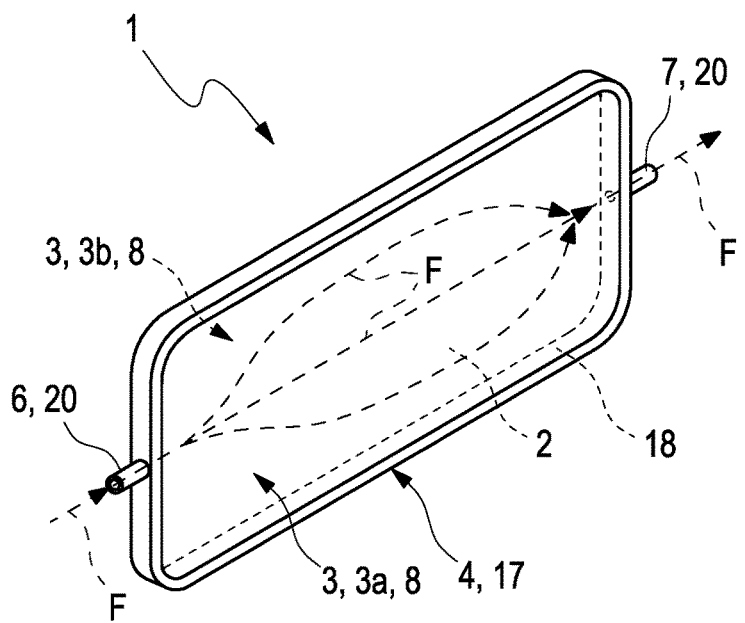
FIGS. 5 and 6 show a third example of a temperature control device according to the invention, in which the fastening device is respectively configured as a fastening frame.

FIG. 5 shows a variant of the example of FIGS. 2 and 3. In the example of FIG. 5, the fastening device 4 is not configured as a fastening strip 10, but rather as a fastening frame 17. The fastening frame 17 surrounds a through-opening in a completely circumferential manner. The through-opening 18 is closed on both sides by the casing 3. In this case, the casing 3 is therefore formed in a two-part manner. Both parts 3a, 3b of the two-part casing 3 can be fastened on the fastening frame 17 in a completely circumferential manner.

Figure 6:
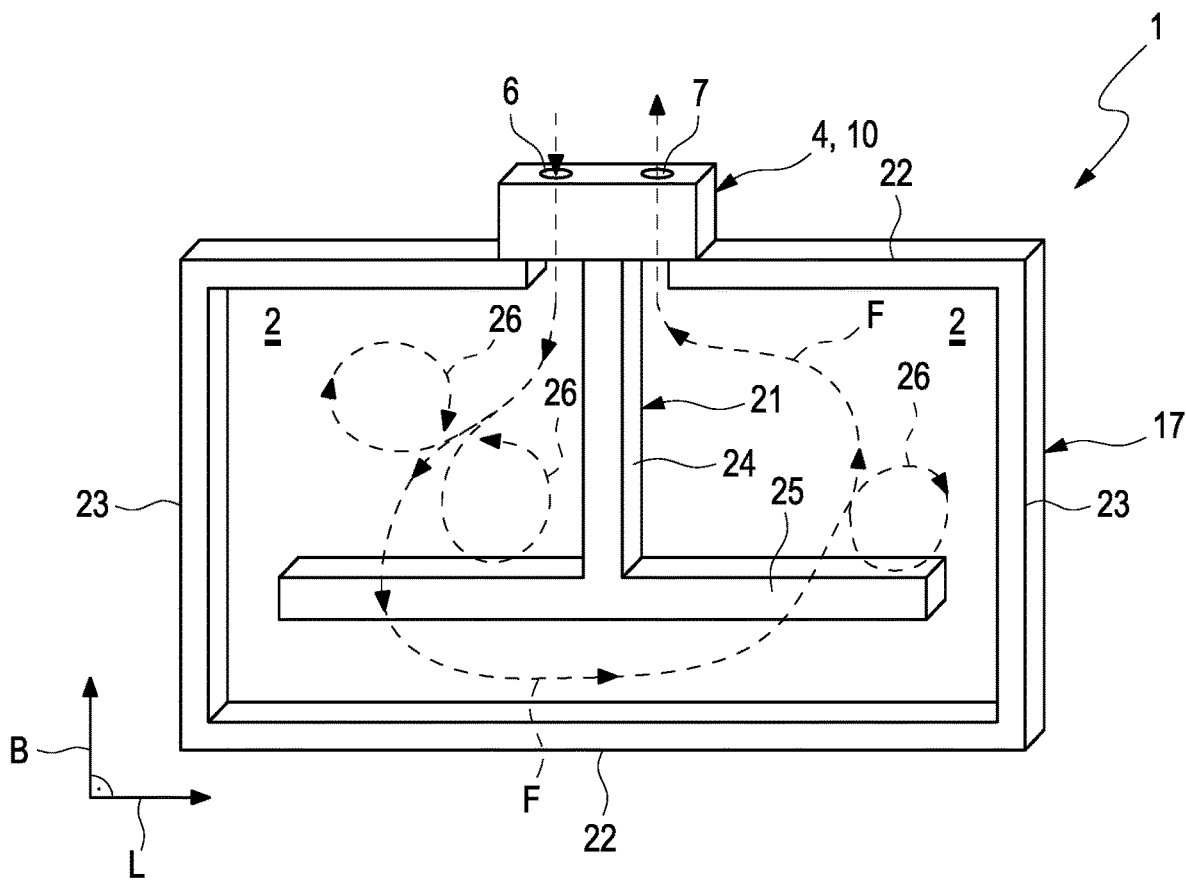

FIG. 6 shows a further example of a temperature control device 1 according to the invention. In the example of FIG. 6, the fastening device 4 is configured as a fastening strip 10 which is able to be flowed through by the temperature control fluid F, on which fastening strip a fastening frame 17 is arranged. This fastening frame 17 delimits, together with the casing 3, the fluid channel 2 (the casing 3 is omitted in FIG. 6 for reasons of clarity). The fastening strip can also be part of the delimiting of the fluid channel 2. The fastening frame 17 can be fastened detachably or non-detachably on the fastening strip 10. In particular, it is conceivable that the fastening frame 17 is formed integrally on the fastening strip 10, i.e. the fastening strip 10 and the fastening frame 17 are formed in one piece and from a single material. In the example of FIG. 5, the fastening frame 17—in contrast to the example of FIG. 5—serves primarily for fastening the casing 3. Therefore, the fastening frame 17 is not configured to be able to be flowed through by the temperature control fluid F.

As the illustration of FIG. 6 shows, a flow-guiding element 21 can be arranged or respectively mounted on the fastening strip 10, which flow-guiding element projects into the fluid channel 3. The temperature control fluid F flowing through the fluid channel 2 can be deflected by the flow-guiding element 21. The resulting flow eddies 26 lead to an improved heat transfer from or to the temperature control fluid F. The efficiency of the temperature control device 1 can therefore be increased by means of the flow-guiding element 21.

As FIG. 6 illustrates in addition, the fastening frame 17 can have a rectangular geometric shaping with two longitudinal sides 22 and with two broad sides 23. The longitudinal sides 22 extend along a longitudinal direction L, the broad sides 23 along a width direction B of the rectangular fastening frame 17. The flow-guiding element 21 can, as shown, have a T-shaped geometry with a foot shank 24 and with a top shank 25, extending perpendicularly to the foot shank 24. Expediently, the foot shank 24 can extend here parallel to the broad side B, therefore along the width direction B, whereas the top shank 25 extends along the direction parallel to the longitudinal side 22, therefore along the longitudinal direction L. A reverse arrangement of foot shank 24 and top shank 25 concerning longitudinal and width direction L, B is also possible.

In all the examples explained above, the casing 3 can be configured in the manner of a bag or in the manner of a cushion.

The invention claimed is:

1. A temperature control device for controlling a temperature of an electric device, comprising:
   at least one fluid channel through which a temperature control fluid is flowable, the at least one fluid channel delimited at least partially by at least one volume-variable casing of a flexible material;

at least one fastening device surrounding a fluid chamber through which the temperature control fluid is flowable;
wherein the at least one casing is coupled to the at least one fastening device such that the fluid chamber is in fluid communication with the at least one fluid channel;
wherein the at least one fastening device is configured as a fastening strip through which the temperature control fluid is flowable; and
wherein a fastening frame is arranged on the fastening strip and, together with the at least one casing, delimits the at least one fluid channel such that the temperature control fluid flowing through the at least one fluid channel contacts the fastening frame and the at least one casing.

2. The temperature control device according to claim 1, wherein:
the fastening frame surrounds a through-opening in a circumferential manner; and
the at least one casing is fastened on two opposite sides of the fastening frame such that both sides of the through-opening are closed by the at least one casing.

3. The temperature control device according to claim 1, wherein a flow-guiding element is arranged on the fastening strip and projects from the fastening strip into the at least one fluid channel.

4. The temperature control device according to claim 3, wherein:
the fastening frame has a rectangular geometric shaping with two longitudinal sides and two broad sides;
the flow-guiding element has a T-shaped geometry with a foot shank and a top shank; and
the foot shank extends parallel to one of (i) a broad side of the two broad sides and (ii) a longitudinal side of the two longitudinal sides, and the top shank extends along the other of (i) the broad side and (ii) the longitudinal side.

5. The temperature control device according to claim 1, wherein the at least one casing is coupled circumferentially on the fastening frame.

6. The temperature control device according to claim 1, wherein the at least one casing is configured as at least one of a bag and a cushion.

7. The temperature control device according to claim 1, wherein the flexible material is a foil.

8. The temperature control device according to claim 1, wherein the at least one casing is configured such that a volume delimited by the at least one casing and forming the at least one fluid channel is greater when the temperature control fluid is flowing through the at least one fluid channel than when the temperature control fluid is not flowing through the at least one fluid channel.

9. The temperature control device according to claim 1, wherein:
the fastening strip extends between and connects opposite ends of the fastening frame such that the fastening strip, the fastening frame, and the at least one casing collectively define the at least one fluid channel; and
a flow-guide protrudes from the fastening strip into the at least one fluid channel, the flow-guide including a foot shank and a top shank, the foot shank extending between and coupling the top shank to the fastening strip such that the flow-guide has a T-shaped geometry.

10. The temperature control device according to claim 1, wherein the fastening strip and the fastening frame are composed of a non-elastic plastic material.

11. A temperature control device for controlling a temperature of an electric device, comprising:

a plurality of volume-variable casings each composed of a flexible material, the plurality of casings including a first casing and a second casing;
the first casing and the second casing at least partially delimiting a fluid channel through which a temperature control fluid is flowable, the at least one fluid channel having a variable volume;
a first fastener defining a first non-volume-variable fluid chamber through which the temperature control fluid is flowable, the first fastener including a temperature control fluid inlet;
a second fastener defining a second non-volume-variable fluid chamber through which the temperature control fluid is flowable, the second fastener including a temperature control fluid outlet;
wherein the first casing and the second casing are disposed between and coupled to the first fastener and the second fastener such that the at least one fluid channel is in fluid communication with the first fluid chamber and the second fluid chamber;
wherein at least one of the first casing and the second casing at least partially delimits an intermediate space configured to receive at least a portion of the electric device which is to be temperature-controlled; and
wherein at least a portion of the intermediate space is disposed between the first fastener and the second fastener.

12. The temperature control device according to claim 11, wherein at least one of the first fastener and the second fastener is configured as a fastening strip, along a longitudinal direction of which the first casing and the second casing are coupled.

13. The temperature control device according to claim 11, wherein:
the first fastener includes a first connecting piece that at least partially forms the temperature control fluid inlet; and
the second fastener includes a second connecting piece that at least partially forms the temperature control fluid outlet.

14. The temperature control device according to claim 11, wherein at least one of the first fastener and the second fastener is structured as a hood.

15. A battery arrangement, comprising:
a plurality of batteries each having a battery housing;
a plurality of temperature control devices each including:
a plurality of volume-variable casings each composed of a flexible material, the plurality of casings including a first casing and a second casing;
at least one fluid channel through which a temperature control fluid is flowable, the at least one fluid channel delimited at least partially by and between the first casing and the second casing; and
at least one fastening device defining a fluid chamber through which the temperature control fluid is flowable, the plurality of casings coupled to the at least one fastening device such that the fluid chamber is in fluid communication with the at least one fluid channel;
wherein the plurality of temperature control devices includes a first temperature control device and a second temperature control device disposed adjacent to one another such that the at least one fastening device of the first temperature control device abuts the at least one fastening device of the second temperature control device;

wherein a battery of the plurality of batteries is disposed in an intermediate space defined by and between the first temperature control device and the second temperature control device;

wherein the first casing of the first temperature control device and the second casing of the second temperature control device, at least when the first temperature control device and the second temperature control device are flowed through by the temperature control fluid, lie flat against opposite sides of the battery housing of the battery.

16. The temperature control device according to claim 1, wherein the at least one casing is coupled to and completely surrounds the fastening frame circumferentially.

17. The battery arrangement according to claim 15, wherein:
the at least one fastening device of the first temperature control device includes a first longitudinal section and a first contact section projecting from the first longitudinal section;
the at least one fastening device of the second temperature control device includes a second longitudinal section and a second contact section projecting from the second longitudinal section; and
the first contact section of the at least one fastening device of the first temperature control device directly contacts the second contact section of the at least one fastening device of the second temperature control device.

18. The battery arrangement according to claim 17, wherein:

the first longitudinal section and the first contact section at least partially define the fluid chamber of the at least one fastening device of the first temperature control device; and
the second longitudinal section and the second contact section at least partially define the fluid chamber of the at least one fastening device of the second temperature control device.

19. The battery arrangement according to claim 17, wherein:
the at least one fastening device of the first temperature control device further includes a first connecting piece projecting from the first longitudinal section;
the first connecting piece at least partially forms at least one of a first temperature control fluid inlet and a first temperature control fluid outlet;
the at least one fastening device of the second temperature control device further includes a second connecting piece projecting from the second longitudinal section; and
the second connecting piece at least partially forms at least one of a second temperature control fluid inlet and a second temperature control fluid outlet.

20. The battery arrangement according to claim 19, wherein at least one of:
the first connecting piece and the first contact section project from the first longitudinal section in opposite directions; and
the second connecting piece and the second contact section project from the second longitudinal section in opposite directions.

\* \* \* \* \*